(No Model.)

W. W. JACQUES.
Electric Cable and Conductor.

No. 242,651. Patented June 7, 1881.

Witnesses.
E. Berliner
Geo. Willis Pierce

Inventor;
W. W. Jacques.

N. PETERS, Photo-Lithographer, Washington, D. C.

UNITED STATES PATENT OFFICE.

WILLIAM W. JACQUES, OF BOSTON, MASSACHUSETTS.

ELECTRIC CABLE AND CONDUCTOR.

SPECIFICATION forming part of Letters Patent No. 242,651, dated June 7, 1881.

Application filed April 25, 1881. (No model.)

*To all whom it may concern:*

Be it known that I, WILLIAM W. JACQUES, of Boston, in the county of Suffolk and State of Massachusetts, have invented certain Improvements in Electric Cables and Conductors, of which the following is a specification.

My invention relates to improvements in electrical conductors, and its object is to enable neighboring conductors to be used at the same time for electrical signals without serious disturbance from one another.

When two or more conductors of electricity are placed near together, as in a cable or otherwise, every signal transmitted over one by the variations of the electrical current will produce in the others corresponding currents, which more or less disturb and interfere with the use of the others for separate and distinct signals, even when each conductor is so perfectly insulated that absolutely no electricity passes from one to another. In the use of such conductors for any very delicate instrument requiring rapid changes of the current—such, for example, as a telephone—this disturbance becomes a source of serious annoyance and inconvenience, even in cables of moderate length, for such instruments, being of necessity made sufficiently sensitive to be affected by the very minute currents which operate upon them, are clearly subject to be influenced by very slight external or foreign currents.

In Letters Patent granted to Dr. Alfred Faucaut, May 18, A. D. 1869, No. 90,089, for improvement in cables, is described one method for preventing this annoyance.

Figure 1:
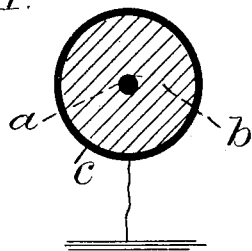
Figure 2:
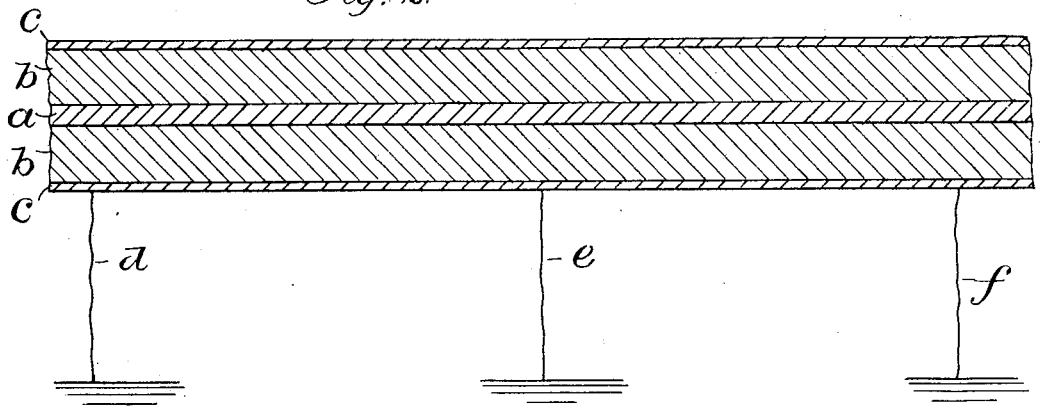

Figures 1 and 2 of the drawings show one conductor of a Faucaut cable, with its lateral dimensions much enlarged for convenience of representation.

The letter $a$ represents the conductor; $b$, the insulating material, such as gutta-percha, kerite, or fiber of cotton or other substance impregnated with any suitable insulating compound.

Figure 3:
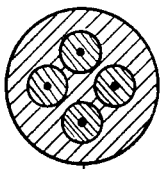

$c$ is an envelope or sheath of a conducting material, conveniently made of metal foil, with a rather fine copper wire wound spirally around it. This conducting-envelope is connected to the ground at suitable intervals, $d\ e f$, by the conductors shown. Several of these protected conductors are made into a cable inclosed in a suitable protective covering, as in Fig. 3. When a signal is made and the signaling-current begins to flow and ceases to flow, or increases and diminishes in the conductor $a$, electrical changes are produced in the sheath $c$. For example, the potential is raised at the point $e$, and this gives rise to a current which flows around the circuit formed by the envelope $c$, the ground-wire $e$, the earth, another ground-wire, $d$ or $f$, and back to the envelope, and thus the electrical equilibrium of the envelope is restored. In order that this operation may proceed with ease and efficiency, it is essential that the circuit over which this equating current flows shall be of small total resistance, and in practice it is found desirable to obtain this small resistance by connecting the conducting-envelope to the ground, with short intervals of space between the connections $d\ e f$—for example, of from one hundred to three hundred feet.

A convenient way of frequently grounding the conducting-envelope and of diminishing the resistance of the equating or compensating circuit is described in Letters Patent granted to Charles E. Chinnock, No. 224,579, bearing date of February 17, 1880; but the conducting-envelope $c$ is very close to the conducting-wire $a$, and its intimate electrical connection with the earth, or with any other infinitely large conducting mass of matter, by frequent connecting-wires, introduces the difficulty of retardation or sluggishness of signals. When such a conductor is used, grounded at such intervals as are found desirable to prevent inductive disturbances, the sluggishness thus caused will in a few miles of cable so blur the rapid signals upon which the operation of the speaking-telephone depends that the actual action at the receiver becomes much enfeebled, and the signals are given indistinctly, or are rendered altogether unintelligible.

The object of my invention is to remedy this evil. To that end, instead of grounding the outer envelope by connecting the wires $d\ e f$ to the ground, as in Fig. 1, I carry them to an insulated conducting-wire, $g\ h$, Fig. 4. This is made of low resistance, and thus affords a circuit of low resistance, while at the same time its inconsiderable size and capacity obviates the difficulty of sluggishness due to the connection with the great mass of the earth, as shown in Fig. 1, and as heretofore practiced.

I will describe one cable with which I have obtained good results, both as regards distinctness of articulation and freedom from inductive disturbances and interfering signals when the other wires in the same cable were used telephonically, without, however, intending to confine myself to this special process, form, or dimensions.

Figure 4:
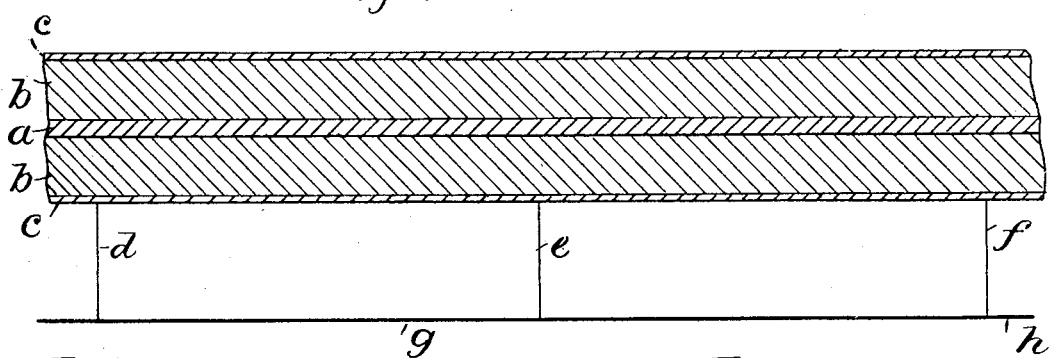

Fig. 4 represents one insulated conductor of this cable with its metallic conductor connected at intervals to the equating-wire. In this cable the conductor $a$ used for the signaling was a copper wire of No. 20 gage, covered with an insulating or non-conducting material, $b$, to No. 10 gage. This was wrapped with metal foil $c$, around which a copper wire of No. 30 gage was wound spirally. The wires $d\ e\ f$ were copper wires of No. 20 gage and a few inches long, applied at intervals of one hundred feet. The wires $g\ h$ gave a resistance of .03 ohms per hundred feet.

In the case of an overhead cable hung from a suspending-wire, as is often practiced, it is obvious that such suspending-wire, if properly insulated, may be used for the equating-conductor $g\ h$. The conductor $g\ h$ may also be strapped to the exterior of the cable, and even included in the same protecting-envelope, provided that it is suitably insulated from the conducting envelope $c$, except at the points designated $d\ e\ f$; or the armor of a cable can be used for the equating-conductor if insulated from the earth.

All the conducting-envelopes may be connected with one and the same equating-conductor, and preferably would be, instead of employing a separate one for each.

What I claim as my invention is—

1. In an electrical cable or group of electrical conductors, the external conducting and anti-induction surface, screen, mass, or envelope of the insulated signal-conducting wire or wires, in combination with the equating-conductor, insulated from the earth and connected to said conducting-envelope by means of electrical connections placed at intervals, as and for the purposes set forth.

2. An electrical cable or group of electrical conductors consisting of signal or main line conductors, each surrounded by an insulating covering and incased in a conducting envelope or sheath connected at intervals with an equating-conductor of small mass and capacity, substantially as set forth.

3. The hereinbefore-described method of obviating or preventing both retardation and induction in electrical cables or conductors by connecting the conducting-sheath surrounding the insulated signal-conductor in such cables to an equating-wire or similar conductor at suitable intervals, substantially as set forth.

In testimony whereof I have signed my name to this specification, in the presence of two subscribing witnesses, this 20th day of April, A. D. 1881.

WILLIAM W. JACQUES.

Witnesses:
J. B. HENCK, Jr.,
T. D. LOCKWOOD.